United States Patent [19]

Dourte et al.

[11] 4,195,913
[45] Apr. 1, 1980

[54] OPTICAL INTEGRATION WITH SCREW SUPPORTS

[75] Inventors: Dixon D. Dourte, Costa Mesa; Richard L. Pierce, Riverside; Walter J. Spawr, Corona, all of Calif.

[73] Assignee: Spawr Optical Research, Inc., Corona, Calif.

[21] Appl. No.: 849,932

[22] Filed: Nov. 9, 1977

[51] Int. Cl.² .......................... G02B 7/18; G02B 5/08
[52] U.S. Cl. ..................................... 350/292; 350/288
[58] Field of Search ............... 350/292, 299, 288, 310; 126/270

[56] References Cited

U.S. PATENT DOCUMENTS

| | | | |
|---|---|---|---|
| 588,177 | 8/1897 | Reagan | 126/270 |
| 797,891 | 8/1905 | Himalaya | 126/270 |
| 2,707,903 | 5/1955 | Trombe | 350/292 |
| 2,760,920 | 8/1956 | Olsen | 126/270 |
| 3,713,727 | 1/1973 | Markosian et al. | 350/292 |

FOREIGN PATENT DOCUMENTS

2285620  4/1976  France ..................................... 350/310

Primary Examiner—Jon W. Henry
Attorney, Agent, or Firm—Lawrence D. Sassone

[57] ABSTRACT

The invention relates to optical integrators and to methods of optically integrating electromagnetic radiation to produce electromagnetic radiation of uniform energy intensity distribution. The method of optically integrating electromagnetic radiation comprises the steps of dissecting electromagnetic radiation into a plurality of segments of electromagnetic radiation, reflecting the resulting segments of electromagnetic radiation resulting in reflected segments of electromagnetic radiation and directing the reflected segments of electromagnetic radiation so that a reflected segment of electromagnetic radiation intersects another reflected segment of electromagnetic radiation at a target. The optical integrator comprises a plurality of reflecting surfaces for dissecting and reflecting electromagnetic radiation thereby resulting in a plurality of reflected segments of electromagnetic radiation, the reflecting surfaces being positioned so that a reflected segment of electromagnetic radiation intersects another reflected segment of electromagnetic radiation at a target.

6 Claims, 22 Drawing Figures

OPTICAL INTEGRATION WITH SCREW SUPPORTS

BACKGROUND OF THE INVENTION

In many applications it is desirable to have a light beam of uniform energy intensity distribution. Unfortunately, many light sources produce a beam of light of non-uniform intensity across its width and whose intensity for a given point will vary because of this non-uniform energy intensity distribution. In particular, this problem is frequently encountered with collimated light of one wave length.

Attempts to create or produce a light beam of uniform intensity across its width have been made with various instruments involving multiple lenses and multiple reflections. However, these attempts have resulted in more problems in that they introduce scatter, absorbtion, energy loss, diffraction, distortion, astigmatism and aberrations to the system. Also, extreme heat may be encountered with some light beams which the prior art cannot cope with. A major problem with the prior art is that most of these prior instruments and methods require a high energy beam to pass through a small focused spot, which is referred to as hard focus, either before, during, or after the integration process in order to perform the integrating function.

A high energy beam going through a hard focus in any medium other than vacuum may cause dielectric breakdown of the medium. Dielectric breakdown manifests itself as an arcing process which creates a plasma that is quite opaque to light beams, and will not allow the light to pass. A hard focus results in a small concentrated point of energy when one takes a lens and places it in the sun and focuses the small spot on a piece of paper. The result of course is a fire. A fire can similarly be created by using a concave mirror to reflect sunlight to a small focused point. This is also a hard focus.

One optical integrator in the prior art requires a focusing mirror, a reflecting apparatus and a projection mirror. The focusing mirror and the projection mirror both cause the electromagnetic radiation to go through a hard focus. The reflecting apparatus, sometimes called an integrator, causes electromagnetic radiation to go through multiple reflections. The reflecting apparatus is basically two reflecting surfaces positioned so that the angle between the two reflecting surfaces is less than 90° and close to zero degrees. At zero degrees the two surfaces would be facing one another. Interference is a severe problem with this prior art optical integrator. For some wave lengths reflectance is only about 60 to 70% such as for electromagnetic radiation of wave length 10.6 micron. When multiple reflections occur the transmission can drop below 50% which in many applications is too much where high intensities are desired.

Another prior art optical integrator is commonly called a light pipe which is essentially a long cylindrically shaped fiber in which the electromagnetic radiation enters the light pipe at one of its ends and is subjected to multiple reflections as the electromagnetic radiation travels along the light pipe. However, the multiple reflections cause absorption to be quite high and therefore this prior art optical integrator has been less than satisfactory also. Another prior art optical integrator resembles the light pipe however it is rectangular in shape. The light travels along the length of the rectangle and again is subjected to multiple reflections.

A system using lenses to optically integrate electromagnetic radiation is commonly called a fly's eye integrator. This prior art optical integrator requires a plurality of lenses to be orientated in the electromagnetic radiation thereby focusing segments of electromagnetic radiation at a desired target. This prior art optical integrator requires that electromagnetic radiation go through a hard focus and tends to absorb large quantities of electromagnetic radiation because the electromagnetic radiation has to pass through multiple lenses.

Thus the prior art optical integrators have the disadvantages of requiring multiple reflections, subjecting the electromagnetic radiation to a hard focus, and requiring lenses or focusing and projection mirrors.

SUMMARY OF THE INVENTION

This invention relates to methods of optical integration and an optical integrator. Optical integration produces electromagnetic radiation of a uniform energy intensity distribution and an area of uniform intensity in the electromagnetic radiation.

A method of optically integrating electromagnetic radiation comprises the steps of reflecting segments of electromagnetic radiation and superimposing the reflected segments of electromagnetic radiation. The reflecting of the segments of electromagnetic radiation accomplishes the dissecting of the electromagnetic radiation into a plurality of segments of electromagnetic radiation. The superimposing of a reflected segment of electromagnetic radiation at the target may be accomplished by directing the reflected segments of electromagnetic radiation at a target so that the reflected segments of electromagnetic radiation are placed one over the other at the target. Optical integration will also result where a first reflected segment of electromagnetic radiation and a second segment of electromagnetic radiation are reflected so that one intersects the other at a target. Similarly, light beams can be optically integrated.

An optical integrator comprises a plurality of reflecting surfaces positioned and having surface areas of such size so that the electromagnetic radiation strikes and is reflected from more than one reflecting surface thereby resulting in the dissection of the electromagnetic radiation into a plurality of reflected segments of electromagnetic radiation, the reflecting surfaces being positioned so that more than one reflected segment of electromagnetic radiation is directed at a target and a plurality of reflected segments of electromagnetic radiation intersect at the target. The reflected segments of electromagnetic radiation may also be superimposed at a target.

One object of the invention is to integrate and provide a uniform radiation intensity distribution from electromagnetic radiation, typically a light beam, thereby resulting in an area across the electromagnetic radiation of uniform intensity. It is a further object of the invention to achieve optical integration without causing the electromagnetic radiation to pass through a hard focus and without the use of lenses or multiple reflections of the electromagnetic radiation. It is a further object of the invention to reduce scatter, absorbtion, energy loss, diffraction, distortion, aberration, dispersion and astigmatism while accomplishing optical integration.

The reflecting surfaces may have a variety of shapes, sizes and configurations. In one preferred embodiment the optical integrator comprises a plurality of rectangular flat reflecting surfaces having the same area so that an image may be formed having the same area as the reflecting surfaces. Each reflecting surface adjoins one or more other reflecting surfaces so that most of the electromagnetic radiation will be reflected and not absorbed by spaces between the reflecting surfaces. The reflecting surfaces are arranged in a concave configuration and positioned so as to be tangent to an imaginary spherical surface. The invention contemplates other configurations.

DETAILED DESCRIPTION

Reference is now made to the accompanying drawings for a better understanding of the invention, wherein all the parts are numbered and capital letters are used to identify directions, points and dimensions.

Electromagnetic radiation includes VLF (very low frequency), micro waves, long radio waves, the broadcast band, short radio waves, infrared, visible light, ultraviolet light, X-rays and gamma rays. Light is commonly used to refer to infrared, visible light and ultraviolet light. Although the invention herein has many applications to light it should be understood that it also applies to electromagnetic radiation in general.

A train of light waves may be represented simply by means of rays. A ray is the path followed by light. From a wave viewpoint, a ray is an imaginary line drawn in the direction in which the wave is traveling. A beam is made of numerous rays.

Figures 1, 2, 3, 4, 5, 10, 11, 12:
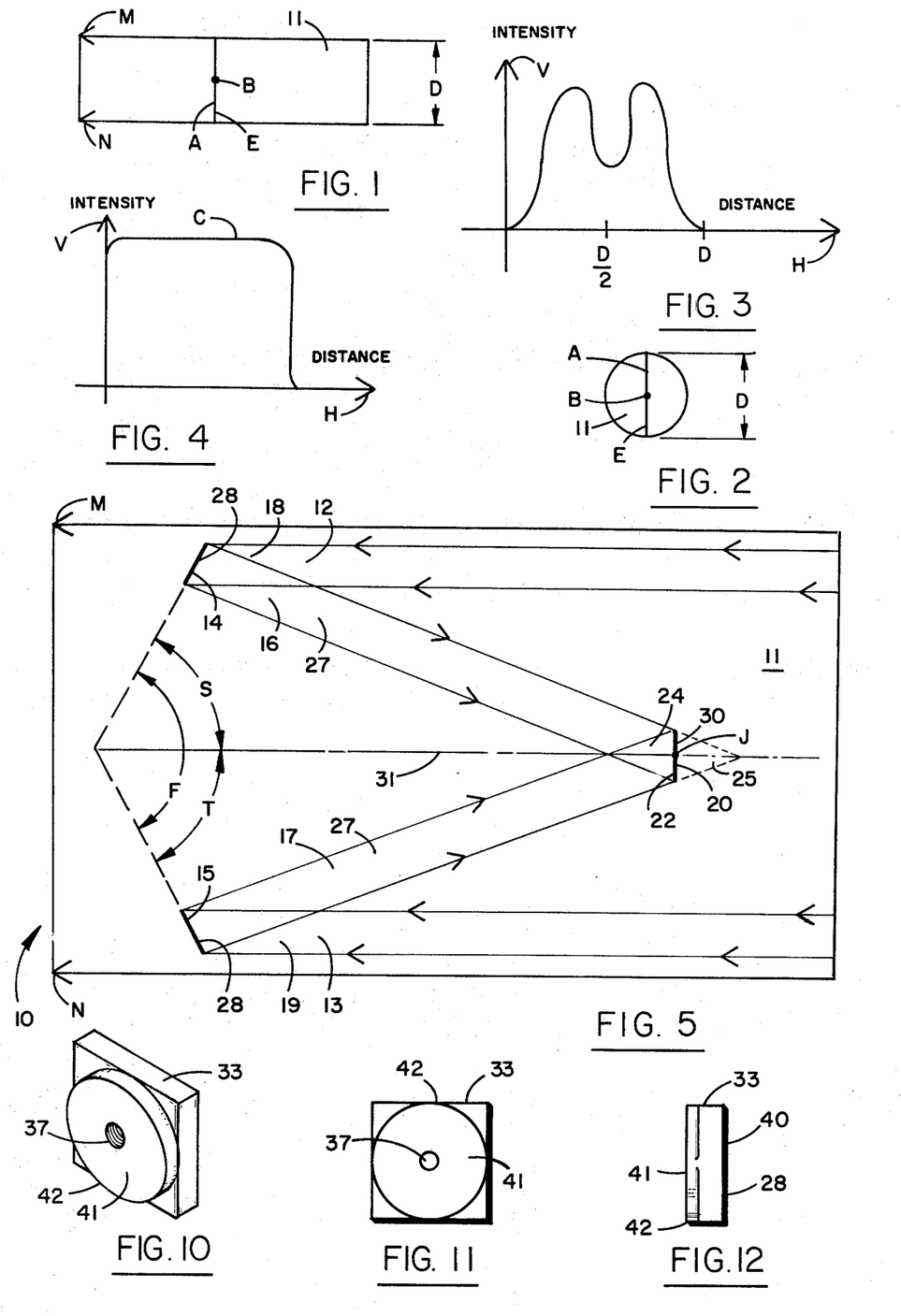
FIG. 1 is a side view of a cylindrically shaped light beam travelling from right to left.
FIG. 2 is a cross section view of the light beam illustrated in FIG. 1.
FIG. 3 is a graphical illustration of the intensity of the light beam on the vertical axis versus the distance along the diameter of the light beam prior to optical integration.
FIG. 4 is a graphical illustration of the intensity of the optically integrated light beam versus the distance along a target.
FIG. 5 is a side view of the light beam shown in FIG. 1 illustrating two reflecting surfaces being struck by the light beam and the resulting reflection of two segments of the light beam to a target where the two reflected segments of the light beam intersect one another and are superimposed on one another.
FIG. 10 is a rear perspective view of a body having a reflecting surface on its front.
FIG. 11 is a rear view of the body shown in FIG. 10.
FIG. 12 is a side view of the body shown in FIG. 10.

Collimated light is light that is parallel and may be thought of as rays of light all going in the same direction. FIG. 1 shows a side view of a cylindrically shaped light beam 11 traveling from right to left in the direction indicated by the arrows M and N. For convenience collimated light is illustrated in FIG. 1 and all other figures unless stated otherwise. A light beam 11 is electromagnetic radiation and has been selected for convenience in illustrating the principles herein. However, it should be understood that the same principles apply also to other forms of electromagnetic radiation. The light beam 11 has a diameter E of length D. A cross section of the light beam 11 is circular in shape as shown in FIG. 2. The light is collimated, however, the intensity of the light beam 11 across its cross section varies. FIG. 3 shows the variance with intensity along the line A which is on the diameter E of the light beam 11. The intensity is plotted on the verticle axis V and the distance along the line A is plotted on the horizontal axis H. FIG. 3 represents a light beam 11 that has a substantial drop in intensity approximately at the middle of the light beam 11 as represented by the point D/2 which represents the intensity at the mid point B of the light beam 11.

The purpose of optical integration is to provide a light beam or electromagnetic radiation of uniform intensity across an area or volume of the light beam or electromagnetic radiation. FIG. 4 illustrates graphically the intensity of a light beam after optical integration. The intensity is plotted on the verticle axis V while distance is plotted on the horizontal axis H. Thus optical integration results in the same intensity across a given area or volume of a light beam or electromagnetic radiation whether it is measured at the edges, middle or points in between as shown by the relatively flat horizontal line C.

In FIG. 5 an optical integrator 10 is indicated generally comprising a plurality of reflecting surfaces 14 and 15 positioned to reflect segments 18 and 19 of electromagnetic radiation so that the reflected segments 16 and 17 of electromagnetic radiation are superimposed at a target 20.

The principle of the invention is illustrated in FIG. 5. The collimated light beam 11 shown in FIG. 1 is shown in FIG. 5 wherein a first portion 12 of the light beam 11 strikes a first reflecting surface 14 and a second portion 13 of the light beam 11 strikes a second reflecting surface 15. This results in a first reflected segment 16 of electromagnetic radiation and a second reflected segment 17 of electromagnetic radiation.

Thus FIG. 5 illustrates an optical integrator 10 comprising a first reflecting surface 14 for reflecting a first segment 18 of electromagnetic radiation thereby resulting in a first reflected segment 16 of electromagnetic radiation and a second reflecting surface 15 for reflecting a second segment 19 of electromagnetic radiation thereby resulting in a second 17 reflected segment of electromagnetic radiation, the second reflecting surface 15 being positioned so that the second reflected segment 17 of electromagnetic radiation intersects the first reflected segment 16 of electromagnetic radiation at a target 20.

FIG. 5 also illustrates an optical integrator 10 comprising a plurality of reflecting surfaces 14 and 15 for reflecting a plurality of segments 18 and 19 of electromagnetic radiation thereby resulting in a plurality of reflected segments 16 and 17 of electromagnetic radiation, the reflecting surfaces 14 and 15 being positioned so that a reflected segment 16 of electromagnetic radiation intersects another reflected segment 17 of electromagnetic radiation at a target 20. In FIG. 5 each reflected segment 16 and 17 intersects each other reflected segment of electromagnetic radiation at a target 20. The reflected segments 16 and 17 of electromagnetic radiation cross one another and do so because of the positioning of the reflecting surfaces 14 and 15.

Figures 8, 9, 13, 14:
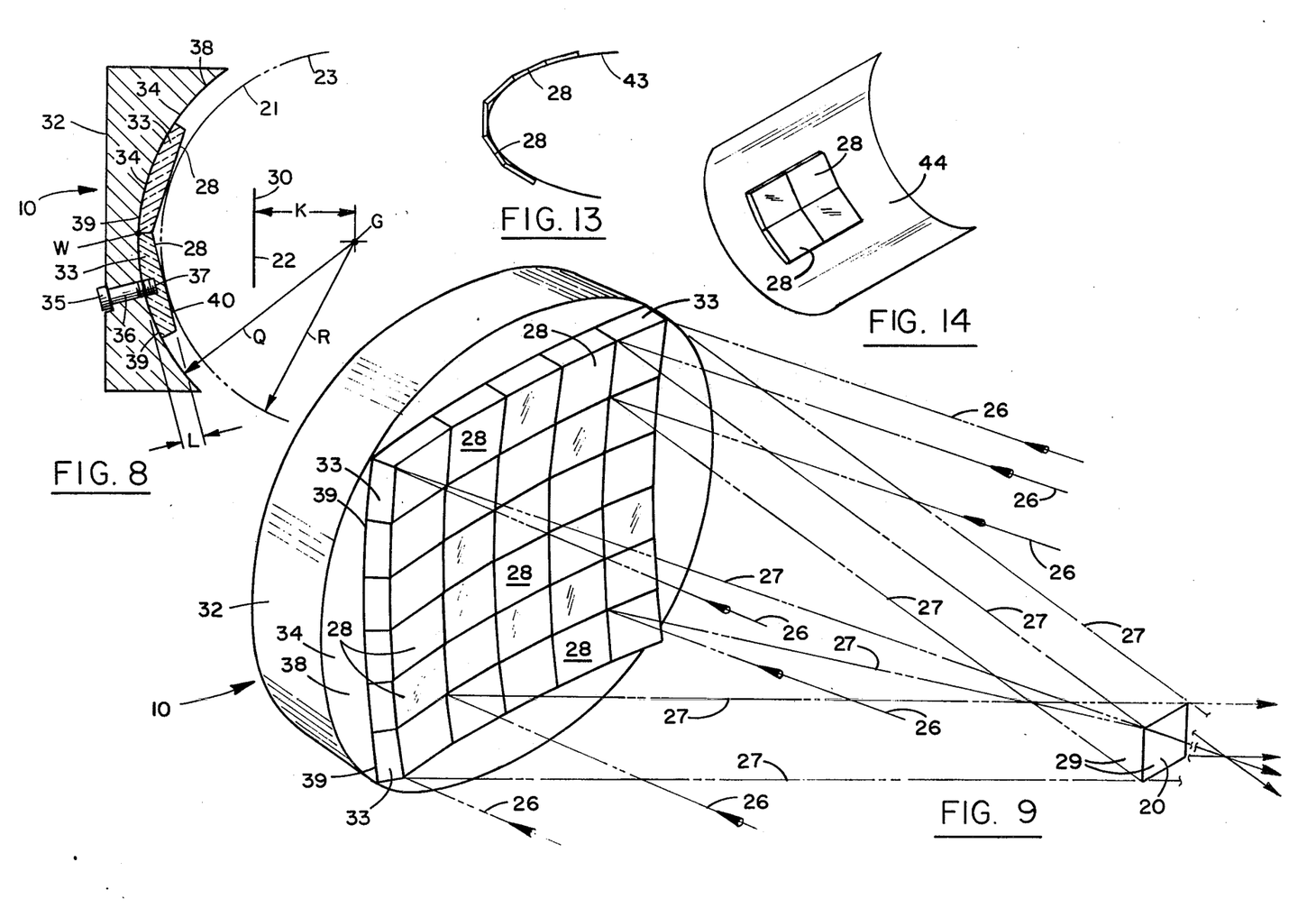
FIG. 8 is a side cross section view of the optical integrator showing a concave configuration and flat reflecting surfaces tangent to an imaginary spherical surface.
FIG. 9 is a front perspective view of the optical integrator shown in FIG. 6 showing how electromagnetic radiation is reflected to a target.
FIG. 13 is a side view of reflecting surfaces tangent to an imaginary parabolic surface.
FIG. 14 is a front perspective view of reflecting surfaces tangent to an imaginary cylindrical surface.

One way to make the reflected segments 16 and 17 of electromagnetic radiation be superimposed, intersect, cross or coincide at the target 20 is to position the reflecting surfaces 14 and 15 so that the light beam 11 will strike both and the reflecting surfaces are perpendicular to the plane of the drawing paper that FIG. 5 is on. A target line 31 perpendicular to the target 20 is drawn assuming the target 20 is a plane perpendicular to the plane of the drawing paper. The reflecting surfaces are positioned at the same distance from the target 20 and so that the angle S between the first reflecting surface 14 and the target line 31 and the angle T between the second reflecting surface 15 and the target line 31 are equal. The reflected segments 16 and 17 of electromagnetic radiation will be superimposed in this embodiment at the target 20 if the reflecting surfaces 14 and 15 are flat and have the same geometric shape and are oriented in the same way and have the same area. The same result can be achieved by positioning the reflecting surfaces 14 and 15 as shown in FIG. 8 and as stated hereinafter.

FIG. 5 also shows a method of optically integrating electromagnetic radiation comprising the steps of reflecting segments 18 and 19 of electromagnetic radiation resulting in reflected segments 16 and 17 of electromagnetic radiation and superimposing the reflected segments 16 and 17 of electromagnetic radiation at a target 20. In addition FIG. 5 shows a method of dissecting electromagnetic radiation into a plurality of segments 18 and 19 of electromagnetic radiation.

In the method shown in FIG. 5 the electromagnetic radiation is dissected by reflecting the segments 18 and 19 of electromagnetic radiation. Physically separated reflected segments 16 and 17 of electromagnetic radiation must result since only the first portion 12 of the light beam 11 strikes the first reflecting surface 14 and only the second portion 13 of the light beam 11 strikes the second reflecting surface 15 and since the angle F between the reflecting surfaces 14 and 15 is less that 180°. The segments 18 and 19 of electromagnetic radiation are reflected so that the second reflected segment 17 of electromagnetic radiation intersects the first reflected segment 16 of electromagnetic radiation at the target 20.

The method of optically integrating electromagnetic radiation shown in FIG. 5 comprises the steps of dissecting the light beam 11 into a plurality of beam segments 18 and 19 and reflecting the plurality of beam segments 18 and 19 resulting in a plurality of reflected beam segments 16 and 17. The reflecting is done so that each reflected beam segment intersects each other reflected beam segment at the target 20. This may be accomplished by directing each reflected beam segment 16 and 17 by appropriately positioned reflecting surfaces 14 and 15 so that each reflected beam segments 16 and 17 intersects each other at the target 20 as shown in FIG. 5. A preferred method of optically integrating electromagnetic radiation is dissecting the electromagnetic radiation, reflecting the resulting segments 18 and 19 of electromagnetic radiation, and directing the reflected segments 16 and 17 to a target in that order. It should be understood that the methods described herein apply to a plurality of segments of electromagnetic radiation and that only two were used in FIG. 5 for purposes of clarity in the drawing and discussion.

The method of optical integration set forth herein is unique compared to the prior art in that it is accomplished be reflecting the electromagnetic radiation only once without the use of a lens and without requiring the electromagnetic radiation to pass through a small focused spot which is referred to as hard focus and requires only one reflection.

The optical integrator 10 produces electromagnetic radiation of uniform intensity because although the electromagnetic radiation may have substantial intensity variation across its whole crossection, such as shown in FIG. 3, the variations across segments of the electromagnetic radiation will be less than that across the whole and will tend to cancel one another out if all such segments were placed one on the other. The optical integrator 10 does this. The use of smaller reflecting surfaces and a greater number of reflecting surfaces gives better results if diffraction and interference are ignored. Although a light beam 11 is referred to hereinabove it should be understood that the principle will apply also to light in general and electromagnetic radiation in general.

In FIG. 5 the first portion 12 of the light beam 11 that strikes the first reflecting surface 14 is a first segment 18 of electromagnetic radiation. After the first segment 18 of electromagnetic radiation strikes the first reflecting surface 14 it becomes the first reflected segment 16 of electromagnetic radiation. The second portion 13 of the light beam 11 that strikes the second reflecting surface 15 is a second segment 19 of electromagnetic radiation. After the second segment 19 of electromagnetic radiation strikes the second reflecting surface 15 it becomes the second reflected 17 segment of electromagnetic radiation. The first reflecting surface 14 and second reflecting surface 15 shown in FIG. 5 are of the same area and are flat and have a rectangular shape and are arranged in a concave configuration. A concave configuration is one in which the angle F between the first reflecting surface 14 and second reflecting surface 15 is less than 180°. In FIG. 5 the reflecting surfaces 14 and 15 are positioned to reflect the segments of electromagnetic radiation 18 and 19 so that the reflected segments of electromagnetic radiation 16 and 17 are superimposed at a target 20. This forms an image 22 at the target 20. In the situation illustrated in FIG. 5 the reflecting surfaces 14 and 15 are positioned so that the image 22 will coincide with the target 20. In the configuration shown in FIG. 5 the reflecting surfaces 14 and 15 are arranged in a spherical concave configuration so that the reflecting surfaces 14 and 15 would be tangent to an imaginary spherical surface 21 as illustrated in FIG. 8. The reflecting surfaces 14 and 15 function similar to small elements of a spherical concave mirror having a focal length equal to $\frac{1}{2}$ of the radius of curvature R of the imaginary spherical surface 21. Thus the location of the image 22 would be at a distance approximately equal to $\frac{1}{2}$ the radius of curvature R of such imaginary spherical surface 21 from the center G of the imaginary sphere 23 as shown in FIG. 8.

The reflecting surfaces 14 and 15 shown in FIG. 5 are also arranged so that the reflected segments 18 and 19 of electromagnetic radiation are reflected upward or downward but not to either side for convenience in illustrating the principles of the invention in two dimensions.

In FIG. 5 the area where the electromagnetic radiation will have uniform intensity is found in the first triangular shaped area 24. If there were no target 20 in the way the area would also include the second triangular shaped area 25 to the right shown by dotted lines.

FIG. 9 shows a method of optically integrating electromagnetic radiation comprising the steps of reflecting segments 26 of electromagnetic radiation resulting in reflected segments 27 of electromagnetic radiation and superimposing the reflected segments 27 of electromagnetic radiation at a target 20. The target 20 may be a point or points in space or any desired object that one wishes to strike with the reflected segments 27 of electromagnetic radiation such as an object to be welded, not shown, a lens, not shown, a screen, not shown, or any other object.

Figure 6:
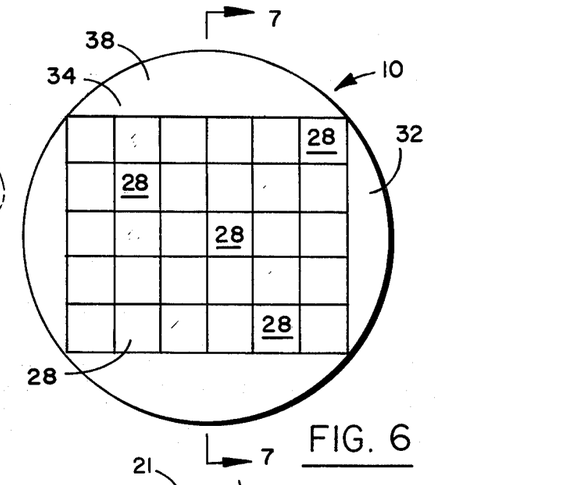
FIG. 6 is a front view of an optical integrator having 30 square flat reflecting surfaces arranged in a concave configuration.
Figures 7, 16:
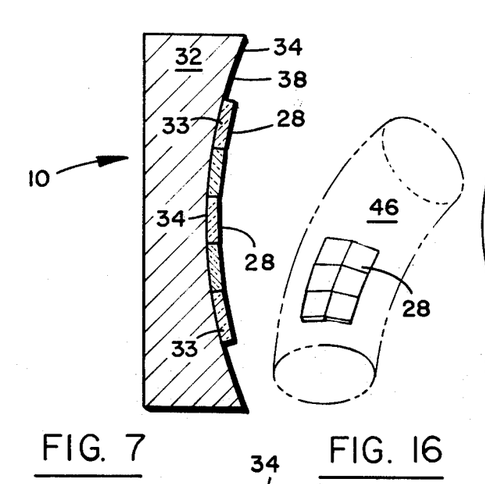
FIG. 7 is a side cross section view along the middle of the optical integrator illustrated in FIG. 6.
FIG. 16 is a front perspective view of reflecting surfaces tangent to an imaginary toroidal surface.

The optical integrator 10 shown in FIGS. 6,7 and 9 is similar to that shown in FIG. 5 except the optical integrator 10 in FIG. 9 has 30 reflecting surfaces 28 and reflected segments 27 of electromagnetic radiation are shown for four of the reflecting surfaces 28. In FIG. 9 the reflecting surfaces 28 are flat, have a square shape and are arranged in a spherical concave configuration. A spherical concave configuration is one in which the reflecting surfaces 28 are tangent to an imaginary spherical surface 21 as illustrated in FIG. 8.

Also shown in FIG. 9 is the space volume 29 where intensity is uniform. For the optical integrator 10 shown in FIG. 9 the space volume 29 has an octahedral shape resembling two four-sided pyramids assembled base to base.

The target 20 illustrated in FIG. 5 is a plane at the focal plane 30 of the optical integrator 10 in that it is centered on and located at the focal point J of an imaginary spherical surface 21 that is tangent to the reflecting surfaces 14 and 15. The image 22 formed at the target 20 is superimposed and is integrated and has a more uniform energy intensity distribution than the electromagnetic radiation prior to integration.

An even more uniform energy intensity distribution results when more than two reflecting surfaces are used. In FIGS. 6,7 and 9 an optical integrator 10 is indicated generally comprising a plurality of reflecting surfaces 28 positioned and having surface areas of such size so that the electromagnetic radiation strikes and is reflected from more than one reflecting surface 28 thereby resulting in the dissection of the electromagnetic radiation into a plurality of reflected segments 27 of electromagnetic radiation, the reflecting surfaces 28 being positioned so that more than one reflected segment 27 of electromagnetic radiation is directed at a target 20 and a plurality of reflected segments 27 of electromagnetic radiation intersect at the target 20. The optical integrator 10 shown in FIGS. 6 and 9 has 30 square flat reflecting surfaces 28 having the same area arranged in a concave configuration. A reflecting surface 28 is adjacent to another reflecting surface 28 so as to reflect as much of the electromagnetic radiation as possible without any spaces in between to absorb the electromagnetic radiation.

FIG. 7 is a cross section view along the middle of the optical integrator 10 illustrated in FIG. 6. In FIG. 6 the reflecting surfaces 28 are coupled to a base 32. In FIG. 7 the reflecting surfaces 28 are on bodies 33. It would be possible to take a solid base 32 and machine the reflecting surfaces 28 directly on the base 32. However, in the embodiment shown in FIG. 7 the reflecting surfaces 28 are on bodies 33. The base 32 has a mounting surface 34 on which the bodies 33 are attached. The bodies 33 may be attached to the mounting surface 34 of the base 32 by using a suitable adhesive or by placing a screw 35 through a hole 36 in the base 32 on the body and into a threaded hole 37 in the body 33 as shown in FIG. 8.

The spherical concave configuration may be acheived by making the mounting surface 34 of the base 32 a spherical concave surface 38 as shown in FIGS. 6,7,8 and 9. The rear surface 39 of the body 33 is then made to mate with the spherical concave mounting surface 38 by shaping the rear surface 39 of the body 33 in the form of a spherical convex surface having the same radius of curvature Q as the spherical concave mounting surface 38 of the base 32. The reflecting surface 28 is on the front 40 of the body 33 as shown in FIG. 8. Then if the reflecting surfaces 28 and their bodies 33 are of the same shape and size they will be interchangable and one may be substituted for the other on assembly. If the height L of the reflecting surfaces 28 with respect to the mounting surface 38 of the base 32 is very small compared to the radius of curvature Q of the mounting surface 38 of the base 32 then the focal plane 30 of the optical integrator 10 will be at a point at a distance from the vertex W approximately equal to $\frac{1}{2}$ the length of the radius of curvature Q of the spherical mounting surface 38 of the base 32 and the length of the radius of curvature Q and radius of curvature R of the imaginary spherical surface 21 will be approximately equal and the imaginary spherical surface 21 will virtually coincide with the spherical concave mounting surface 38 of the base 32.

FIGS. 10,11 and 12 illustrate another embodiment of a body 33 for use with a base 32 having a spherical concave surface 38 wherein the body 33 is coupled to the base 32. The body 33 in FIGS. 10, 11 and 12 has a front reflecting surface 28 and a rear flat circular surface 41. The rear flat circular surface 41 is parallel to the reflecting surface 28. A threaded hole 37 is centered in the body 33 and perpendicular to the reflecting surface 28. The body 33 in this embodiment is coupled to the base by placing the rear flat circular surface 41 of the body 33 against the spherical concave surface 38 of the base and it is secured in a manner similar to that shown in FIG. 8. The edge 42 of the rear flat circular surface 41 of the body 33 will contact the spherical concave surface 38 along the entire edge 42 thereby aligning the reflecting surface 28 so that it will be tangent to an imaginary spherical surface 21 regardless of where the body 33 is placed on the spherical concave surface 38 the principles of which are shown in FIG. 8. This embodiment allows the body 33 to be coupled to virtually any spherical concave surface regardless of its radius of curvature and eliminates the need to machine a convex surface on the rear of the body for each different spherical concave surface.

FIG. 8 illustrates an optical integrator 10 further comprising a base 32 having a spherical concave surface 38 and a body 33 coupled to the base 32, the body 33 having a front reflecting surface 28 and a rear spherical convex surface 39 having the same radius of curvature Q as the spherical concave surface 38 of the body 33 to mate to the spherical concave surface 38 of the base 32. The reflecting surfaces 28 are flat in FIG. 8 and of equal area for convenience in illustrating the principals herein.

The optical integrator 10 shown in FIGS. 5,6,7,8 and 9 has a plurality of reflecting surfaces 28 positioned so that a plurality of the reflected segments 27 of electromagnetic radiation are superimposed at a target 20 and coincide at the target 20 and are further positioned so that more than one reflected segment 27 of electromagnetic radiation is directed at a target plane 20 and a plurality of reflected segments 27 of electromagnetic radiation intersect at the target plane 20.

The optical integrator 10 shown in FIGS. 6,7,8 and 9 comprises a plurality of rectangular flat reflecting surfaces 28 having the same area, each reflecting surface 28 adjoining one or more other reflecting surfaces 28 and arranged in a concave configuration and positioned so as to be tangent to an imaginary spherical surface 21.

FIG. 9 represents a front perspective view of the optical integrator 10 shown in FIGS. 6 and 7 and is similar in principal to that shown in FIG. 8. The optical integrator 10 has thirty reflecting surfaces 28 that are adjacent to one another and are flat, square, and of equal area. FIG. 9 shows what happens when electromagnetic radiation strikes the reflecting surfaces 28 and is reflected. The electromagnetic radiation strikes all of the reflecting surfaces 28 and is collimated and traveling from right to left similar to the light beam 11 shown in FIG. 1. In FIG. 9 for sake of clarity the segments 26 of electromagnetic radiation are shown as one or more lines 26 representing the path of the electromagnetic radiation prior to the electromagnetic radiation striking a reflecting surface 28. The arrows on the lines 26 indicate the direction of travel of the electromagnetic radiation. The electromagnetic radiation is dissected into segments 26 of electromagnetic radiation when the electromagnetic radiation strikes a plurality of reflecting surfaces 28.

Also for clarity the reflected segments 27 of electromagnetic radiation are shown as lines 27 representing the path of the reflected segments 27 of electromagnetic radiation.

The use of reflecting surfaces 28 that are flat allows the optical integration to be performed without the electromagnetic radiation going through a hard focus. A hard focus would result if one used a spherical convex lens or a spherical concave mirror because each of these would cause the electromagnetic radiation to be focused at a small spot. For example a spherical convex lens can cause rays from the sun to go through a hard focus resulting in extreme heat at the small focus spot, a principal very familiar to those who use such lenses to start fires. Likewise, a spherical concave mirror can cause the rays of the sun to go through a hard focus resulting in extreme heat at the small focus spot sufficient enough to start a fire. In the same manner a high energy beam passing through a hard focus will generate sufficient heat to cause dielectric breakdowns which prevents the beam from passing through the air. The optical integrator 10 does not cause electromagnetic radiation to go through a hard focus. Instead the optical integrator 10 shown in FIG. 9 causes the electromagnetic radiation to pass through a target 20 that is a plane in this case which is the same size and shape as the individual reflecting surfaces. All thirty reflected segments 27 of electromagnetic radiation will pass through the target 20. Also all thirty reflected segments 27 of electromagnetic radiation would pass through the space volume 29. Thus if an observer had his eye positioned at any place in the space volume 29 then the observer would be able to see reflected segments 27 of electromagnetic radiation from each and every one of the thirty reflecting surfaces 28. All thirty reflected segments 27 of electromagnetic radiation are superimposed one on the other at the target 20. Each reflected segment 27 of electromagnetic radiation intersects and crosses each other reflected segment 27 of electromagnetic radiation in the space volume 29.

FIG. 9 demonstrates a lensless optical integrator 10 wherein the plurality of reflecting surfaces 28 are positioned so that each segment 26 of electromagnetic radiation is reflected only once. This is accomplished by positioning the reflecting surfaces so that the angle F as shown in FIG. 5 between two of the plurality of reflecting surfaces 28 is not less than 90°. In the lensless optical integrator 10 shown in FIG. 9 the angle F between any two of the plurality of reflecting surfaces 28 is not less than 90°. To avoid the effects of spherical aberration it is perferred that the angel F between any two adjoining reflecting surfaces 28 be close to 180° because smaller angles will result in more spherical aberration and may possibly cause multiple reflections. In order to help minimize the effects of spherical aberrations the angle between any two of the plurality of reflecting surfaces that is struck by the electromagnetic radiation should not be less than 90°. If any one reflecting surface 28 is not struck by electromagnetic radiation then the angle between it and the other reflecting surfaces 28 is of no concern since it does not take part in the optical integration.

From the foregoing it is apparent that the angle F between any of the plurality of reflecting surfaces should not be zero degrees. A zero degree angle F would correspond to two reflecting surfaces facing one another and parallel to one another. It would be possible to have two or more reflecting surfaces 28 at an angle F of 180°, that is, parallel to one another and facing the same direction. However, such a configuration would not result in optical integration unless additional reflecting surfaces 28 were employed. Reflecting surfaces 28 that are at an angle F of 180° will produce reflected segments 27 of electromagnetic radiation that are parallel to one another and will not cause the reflected segments of electromagnetic radiation to intersect one another. Therefore the optical integrator 10 must have at least one reflecting surface 28 that is at an angle F other than 180° to another reflecting surface 28.

FIG. 9 shows a method of lenslessly optically integrating electromagnetic radiation comprising the steps of dissecting the electromagnetic radiation into a plurality of segments 26 of electromagnetic radiation and reflecting the plurality of segments 27 of electromagnetic radiation only once thereby resulting in a plurality of reflected segments 27 of electromagnetic radiation and so that a plurality of reflected segments 27 of electromagnetic radiation intersect thereby producing optically integrated electromagnetic radiation. This method also comprises the step of striking a target 20 with the optically integrated electromagnetic radiation prior to the electromagnetic radiation, plurality of segments 26 of electromagnetic radiation, plurality of reflected segments 27 of electromagnetic radiation or optically integrated electromagnetic radiation being subjected to a hard focus. It is significant that this method optically integrates electromagnetic radiation without subjecting the electromagnetic radiation to a hard focus. This method comprises the additional step of positioning a plurality of reflecting surfaces 28 so that the angle F between two of the plurality of reflecting surfaces 28 if not less than 90° and so that the electromagnetic radiation strikes a plurality of reflecting surfaces 28. This method of lenslessly optically integrating electromagnetic radiation is a method of lenslessly transforming electromagnetic radiation into electromagnetic radiation of more uniform intensity thereby producing electromagnetic radiation of more uniform intensity.

The optical integrator 10 may have reflecting surfaces 28 arranged in a concave configuration other than the spherical concave configuration shown in FIGS. 5,7,8 and 9. A concave configuration may in general be defined as one in which the angle F as defined in FIG. 5 is less than 180° or one in which the reflecting surfaces 28 are tangent to a concave surface such as shown in FIGS. 13 and 14. In FIG. 13 the reflecting surfaces 28 are positioned so as to be tangent to an imaginary parabolic surface 43. Such a configuration will result in a space volume where optical integration occurs of smaller volume than the embodiment shown in FIG. 8 or FIG. 9.

In FIG. 14 the reflecting surfaces 28 are positioned so as to be tangent to an imaginary cylindrical surface 44. This configuration could produce an area of optical integration resembling a long narrow rectangle.

Figures 15, 18:
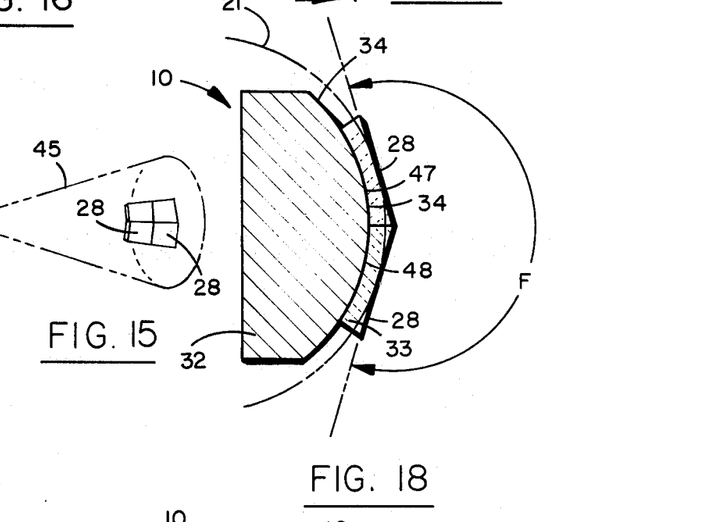
FIG. 15 is a front perspective view of reflecting surfaces tangent to an imaginary conical surface.
FIG. 18 is a side cross section view of an optical integrator having flat reflecting surfaces arranged in a convex configuration.

In FIG. 15 the reflecting surfaces 28 are positioned so as to be tangent to an imaginary conical surface 45. This configuration could produce an area of optical integration shaped like a triangle.

FIG. 16 illustrates reflecting surfaces 28 positioned so as to be tangent to an imaginary toroidal surface 46. This configuration could produce a large variety of areas where optical integration occurs.

Figure 17:
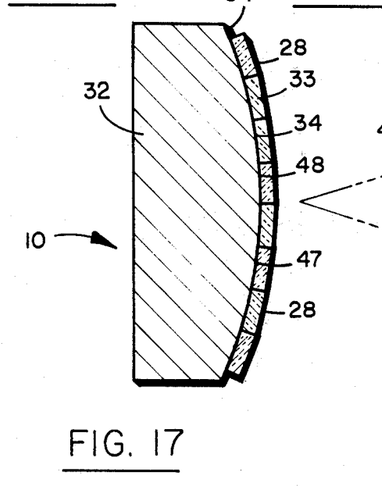
FIG. 17 is a side cross section view of an optical integrator having flat reflecting surfaces arranged in a convex configuration.

In FIGS. 17 and 18 an optical integrator 10 is shown wherein the reflecting surfaces 28 are arranged a convex configuration. FIGS. 17 and 18 are furthermore spherical convex configurations in that the reflecting surfaces 28 are tangent to an imaginary spherical surface 21. A convex configuration may be defined as one in which the angle F between the reflecting surfaces 28 is greater than 180°.

FIG. 17 is a side view of the optical integrator 10 in a convex configuration and may be contrasted with the optical integrator 10 shown in FIG. 7 but in a concave configuration. An exaggerated view of an optical integrator 10 where the reflecting surfaces 28 are arranged in a convex configuration is shown in FIG. 18. In both FIGS. 17 and 18 the reflecting surfaces 28 are flat and are adjacent to one other reflecting surface 28. The optical integrator 10 is assembled by means of a base 32 having a spherical convex surface 47 and a body 33 coupled to the base 32, the body 33 having a front reflecting surface 28 and a rear spherical concave surface 48 made to mate with the spherical convex surface 47 of the base 32.

In a convex configuration such as shown in FIGS. 17 and 18 where the reflecting surfaces 28 are flat optical integration will not take place unless converging electromagnetic radiation is incident on the reflecting surfaces 28. Thus such a configuration may be used to optically integrate converging electromagnetic radiation.

Figure 19:
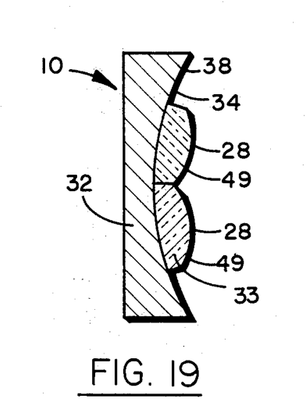
FIG. 19 is a side cross section view of an optical integrator having convex reflecting surfaces arranged in a concave configuration.

FIGS. 19,20,21 and 22 illustrate other embodiments of the invention. FIG. 19 is a side view of an optical integrator 10 having convex reflecting surfaces 49 arranged in a concave configuration. One feature of the embodiment shown in FIG. 19 is that a larger area where optical integration results compared to if the reflecting surfaces 28 were flat.

Figure 20:
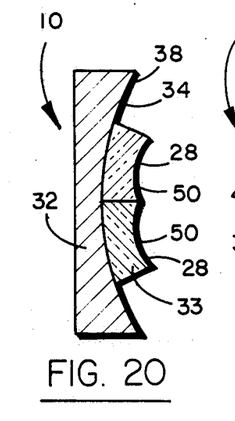
FIG. 20 is a side cross section view of an optical integrator having concave reflecting surfaces arranged in a concave configuration.

FIG. 20 is a side view of an optical integrator 10 having concave reflecting surfaces 50 arranged in a concave configuration. A feature of the embodiment shown in FIG. 20 is that very small and intense areas of optical integration can be produced compared to reflecting surfaces that are flat.

Figures 21, 22:
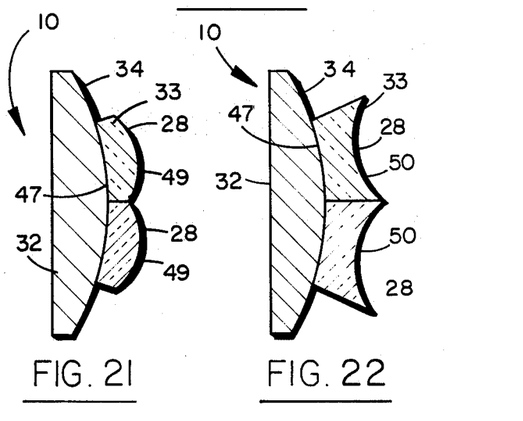
FIG. 21 is a side cross section view of an optical integrator having convex reflecting surfaces arranged in a convex configuration.
FIG. 22 is a side cross section view of an optical integrator having concave reflecting surfaces arranged in a convex configuration.

FIG. 21 is a side view of an optical integrator 10 having convex reflecting surfaces 49 arranged in a convex configuration. A feature of the embodiment shown in FIG. 21 is that very large areas of optical integration can be produced of very low intensity.

FIG. 22 is a side view of on optical integrator 10 having concave reflecting surfaces 50 arranged in a convex configuration suitable for optically integrating electromagnetic radiation that is converging.

The reflecting surfaces 28 may be made from polished surfaces, mirrors or any other surface capable of reflecting electromagnetic radiation. Metals suitable as surfaces are copper, tungsten and molybdenum, among others.

In applications involving high energy a water cooled base 32 will help disapate and remove the heat and minimize distortion caused by high temperatures. In many applications the reflected segments 27 of electromagnetic radiation may be directed back into the electromagnetic radiation as shown in FIG. 5 or the reflecting surfaces 28 may be tilted sideways so that the reflected electromagnetic radiation is out of the electromagnetic radiation that is about to strike the reflecting surfaces 28.

Where the electromagnetic radiation is monochromatic light, that is light having a single wave length, interference and diffraction may occur which will affect the desired uniformity of intensity. Larger reflecting surfaces can minimize this effect.

In the embodiment shown in FIGS. 7 and 9 if the electromagnetic energy strikes only four of the reflecting surfaces 28 then the resulting intensity of the image 22 at the target 20 will be four times that of the electromagnetic radiation prior to striking the reflecting surfaces 28. Similarly if ten reflecting surfaces were struck then the resulting intensity would be ten times that of the electromagnetic radiation prior to striking the reflecting surfaces 28.

The bodies 33 may be made of copper, tungsten, molybdenum and other metals and materials. Molybdenum has the advantages of high power handling capacity, high damage threshold and high reflectance in the infrared. Various coatings may be put on the bodies 33 resulting in reflecting surfaces 28 of the desired characteristics.

The base 32 may be made of any suitable material capable of holding the reflectng surfaces in the desired configuration. Metals are preferred because of their strength.

In actual use the base 32 may be held by a clamp, not shown, which in turn may be fastened to a rail, not shown, or other conventional optical holding devices so that the optical integrator 10 may be oriented in the desired manner for a given application.

During optical integration with the optical integrator 10 shown in FIG. 9 monochromatic light will produce interference fringes which will tend to produce non-uniform intensities. This can be minimized by using light of smaller wave lengths and reflecting surfaces 28 of greater area where the reflecting surfaces are square and of equal area and by decreasing the radius of curvature R described in FIG. 8. Interference would manifest itself in FIG. 4 by changing the line C from a straight line to a wavey line.

Diffraction occurs because of the edges of the reflecting surfaces 28 shown in FIG. 9. The effect of diffraction is to cause a gradual build up of intensity to its maximum level in FIG. 4 instead of a vertical instantaneous rise. The distance over which it takes to reach the maximum level represented by the line C is approximately equal to 1.22 multiplied by the wave length of the electromagnetic radiation and by the radius of curvature R and divided by the width of the reflecting surface 28. This distance can be reduced to 0.02 inches for reflecting surfaces of a 0.5 inch width for most applications.

FIG. 9 illustrates a lensless non hard focusing optical integrator and a method of lenslessly optically integrating electromagnetic radiation without subjecting the electromagnetic radiation to a hard focus.

In FIGS. 5,7,8,9 and 17 through 22 the electromagnetic radiation would be traveling from right to left and would be striking at least two reflecting surfaces 28. The electromagnetic radiation in each of these Figures is collimated.

FIG. 9 illustrates a non-hard focusing optical integrator 10 comprising a plurality of reflecting surfaces 28 positioned and shaped so that the electromagnetic radiation is not subject to a hard focus and so that the electromagnetic radiation strikes more than one reflecting surface 28 and is reflected only once from a plurality of reflecting surfaces 28 thereby resulting in a plurality of reflected segments 27 of electromagnetic radiation and so that a plurality of reflected segments 27 of electromagnetic radiation intersect. The electromagnetic radiation will not be subjected to a hard focus if the reflecting surfaces 28 are flat and shaped like a square. Having reflecting surfaces 28 that are flat will prevent the electromagnetic radiation from being subjected to a hard focus because the smallest area that electromagnetic radiation could be focused to would be equal in size to the area of an individual reflecting surface 28. Reflecting surfaces 28 that are square having a side equal to approximately ½ inch are suitable for this purpose. The reflecting surfaces 28 may be positioned so that the electromagnetic radiation strikes more than one reflecting surface 28. It is preferred that the area of each reflecting surface be substantially less than the cross section of the electromagnetic radiation such as illustrated in FIG. 2 and FIG. 5. By positioning the reflecting surfaces 28 as shown in FIG. 9 the electromagnetic radiation will be reflected only once. Another example of how to position the reflecting surfaces 28 so that only one reflection occurs is shown in FIG. 5 where the angle between the reflecting surfaces F is not less than 90° and is less than 180° where collimated electromagnetic radiation is used. The reflecting surfaces 28 may be positioned so that a plurality of reflected segments 27 of electromagnetic radiation intersect by shining a light on the reflecting surfaces 28 and observing where the reflections travel. For example if a light is shined on reflecting surfaces 28 and a screen is used to see where the reflections end up then the reflecting surfaces 28 may be positioned so that the reflections will intersect one another at the screen. Similarly the reflecting surfaces 28 can be positioned so that the reflected segments 27 of electromagnetic radiation are superimposed and coincide.

FIG. 9 illustrates a non-hard focusing method of optically integrating electromagnetic radiation comprising the steps of dissecting the electromagnetic radiation into a plurality of segments 26 of electromagnetic radiation and positioning a plurality of reflecting surfaces 28 so the electromagnetic radiation strikes more than one reflecting surface 28 and reflecting a plurality of segments 26 of electromagnetic radiation only once with a plurality of reflecting surfaces 28 so that a plurality of reflected segments 27 of electromagnetic radiation intersect and shaping the plurality of reflecting surfaces 28 so electromagnetic radiation is not subjected to a hard focus.

In a sense partial optical integration occurs when segments 26 of electromagnetic radiation are reflected and the reflected segments 27 of electromagnetic radiation intersect. In FIG. 9 the reflected segments 27 of electromagnetic radiation from adjoining reflecting surfaces 28 intersect well before the space volume 29. However, all reflected segments 27 of electromagnetic radiation intersect only in the space volume 29 and therefore the most uniform intensities will be found only in the space volume 29. Full optical integration in that sense occurs only when each and every reflected segment 27 of electromagnetic radiation is superimposed.

Molybdenum is a suitable material for a reflecting surface 28 for visible light and infra red. Alluminum is a suitable material for ultra violet light and radio waves and micro waves and VLF (Very Low Frequency).

It is to be understood that the invention is not limited to the exact details of construction, operation, or the exact materials or embodiments and methods shown and described, as obvious modifications and equivalents will be apparent to one skilled in the art, and the invention is therefore to be limited only by the scope of the appended claims.

What is claimed is:

1. An optical integrator, comprising:
   a base having a spherical concave surface and a hole;
   a plurality of reflecting surfaces for reflecting a plurality of segments of electromagnetic radiation thereby resulting in a plurality of reflected segments of electromagnetic radiation, the reflecting surfaces being positioned so that a plurality of reflected segments of electromagnetic radiation intersect at a target;

a body having a threaded hole and a front reflecting surface and a rear flat circular surface parallel to the front reflecting surface of the body; and a screw wherein the rear flat circular surface of the body is secured to the spherical concave surface of the base by placing the screw through the hole in the base and into the threaded hole of the body.

2. The optical integrator as claimed in claim 1 wherein each reflecting surface is flat and has a square shape and each reflecting surface adjoins a plurality of other reflecting surfaces.

3. The optical integrator as claimed in claim 1 wherein the hole of the base is perpendicular to the spherical concave surface of the base and the threaded hole of the body is centered in the body and perpendicular to the reflecting surface.

4. An optical integrator as claimed in claim 1 wherein the reflecting surfaces are concave surfaces.

5. An optical integrator as claimed in claim 1 wherein the reflecting surfaces are convex surfaces.

6. An optical integrator, comprising:

a base having a spherical concave surface and a plurality of holes;

a plurality of reflecting surfaces;

a plurality of bodies, each body having a rear surface and a rear circular edge and a reflecting surface on the front of the body and a threaded hole in the rear surface of the body; and a plurality of screws wherein the rear circular edge of each body is secured to the spherical concave surface of the base by placing a screw through a hole in the base and into a threaded hole of the body.

* * * * *